United States Patent
Yoshikawa et al.

(10) Patent No.: US 11,481,924 B2
(45) Date of Patent: Oct. 25, 2022

(54) POSITION ESTIMATION SYSTEM AND POSITION ESTIMATION METHOD

(71) Applicant: MICWARE CO., LTD., Kobe (JP)

(72) Inventors: Sumito Yoshikawa, Kobe (JP); Shigehiko Miura, Kobe (JP)

(73) Assignee: MICWARE CO., LTD., Kobe (JP)

( * ) Notice: Subject to any disclaimer, the term of this patent is extended or adjusted under 35 U.S.C. 154(b) by 78 days.

(21) Appl. No.: 17/060,672

(22) Filed: Oct. 1, 2020

(65) Prior Publication Data

US 2021/0110573 A1 Apr. 15, 2021

(30) Foreign Application Priority Data

Oct. 9, 2019 (JP) .............................. JP2019-185771

(51) Int. Cl.
*H04N 9/47* (2006.01)
*G06T 7/73* (2017.01)
(Continued)

(52) U.S. Cl.
CPC ................ *G06T 7/74* (2017.01); *B60K 35/00* (2013.01); *G01C 21/3626* (2013.01);
(Continued)

(58) Field of Classification Search
CPC ............. G06T 7/74; G06T 2207/20076; G06T 2207/20081; G06T 2207/30252;
(Continued)

(56) References Cited

U.S. PATENT DOCUMENTS

| 8,849,036 B2 * | 9/2014 | Shin ..................... G05D 1/0246 382/153 |
| 9,683,832 B2 * | 6/2017 | Wang ..................... G01S 19/49 |

(Continued)

FOREIGN PATENT DOCUMENTS

| JP | 9-152348 A | 6/1997 |
| JP | 2004-138427 A | 5/2004 |

(Continued)

OTHER PUBLICATIONS

Extended European Search Report, dated Feb. 11, 2021, for European Application No. 20200260.6.

(Continued)

*Primary Examiner* — Gims S Philippe

(74) *Attorney, Agent, or Firm* — Birch, Stewart, Kolasch & Birch, LLP

(57) ABSTRACT

An acquisition circuit acquires first position information indicating a position and a first image captured by a camera at the position indicated by the first position information. A memory stores second position information indicating a prescribed position on a map and feature information extracted from a second image corresponding to the prescribed position. The second position information is associated with the feature information. A processor estimates (Continued)

the position indicated by the first position information on the basis of the second position information in the case that the position indicated by the first position information falls within a prescribed range from the prescribed position indicated by the second position information and the first image corresponds to the feature information.

5 Claims, 21 Drawing Sheets

(51) Int. Cl.
    *G01C 21/00*     (2006.01)
    *B60K 35/00*     (2006.01)
    *G01C 21/36*     (2006.01)

(52) U.S. Cl.
    CPC ..... *G01C 21/3667* (2013.01); *G01C 21/3807* (2020.08); *B60K 2370/152* (2019.05); *B60K 2370/166* (2019.05); *B60K 2370/176* (2019.05); *G06T 2207/20076* (2013.01); *G06T 2207/20081* (2013.01); *G06T 2207/30252* (2013.01)

(58) Field of Classification Search
    CPC .............. B60K 35/00; B60K 2370/152; B60K 2370/166; B60K 2370/176; G01C 21/3626; G01C 21/3667; G01C 21/3807; G01C 21/005; G06V 20/182; G06V 20/56
    See application file for complete search history.

(56) References Cited

U.S. PATENT DOCUMENTS

| | | | |
|---|---|---|---|
| 2009/0005929 A1* | 1/2009 | Nakao | B60T 7/22 |
| | | | 701/33.4 |
| 2014/0005932 A1 | 1/2014 | Kozak et al. | |
| 2016/0323716 A1 | 11/2016 | Li et al. | |
| 2019/0257659 A1 | 8/2019 | Moteki et al. | |
| 2020/0065996 A1* | 2/2020 | Lasaruk | G06T 7/80 |
| 2020/0191975 A1 | 6/2020 | Watanabe | |
| 2020/0333789 A1* | 10/2020 | Suzuki | G05D 1/0248 |

FOREIGN PATENT DOCUMENTS

| | | |
|---|---|---|
| JP | 2014-160031 A | 9/2014 |
| JP | 2016-143364 A | 8/2016 |
| JP | 2019-45364 A | 3/2019 |

OTHER PUBLICATIONS

Japanese Office Action for Japanese Application No. 2019-185771, dated Oct. 12, 2021, with English translation.

* cited by examiner

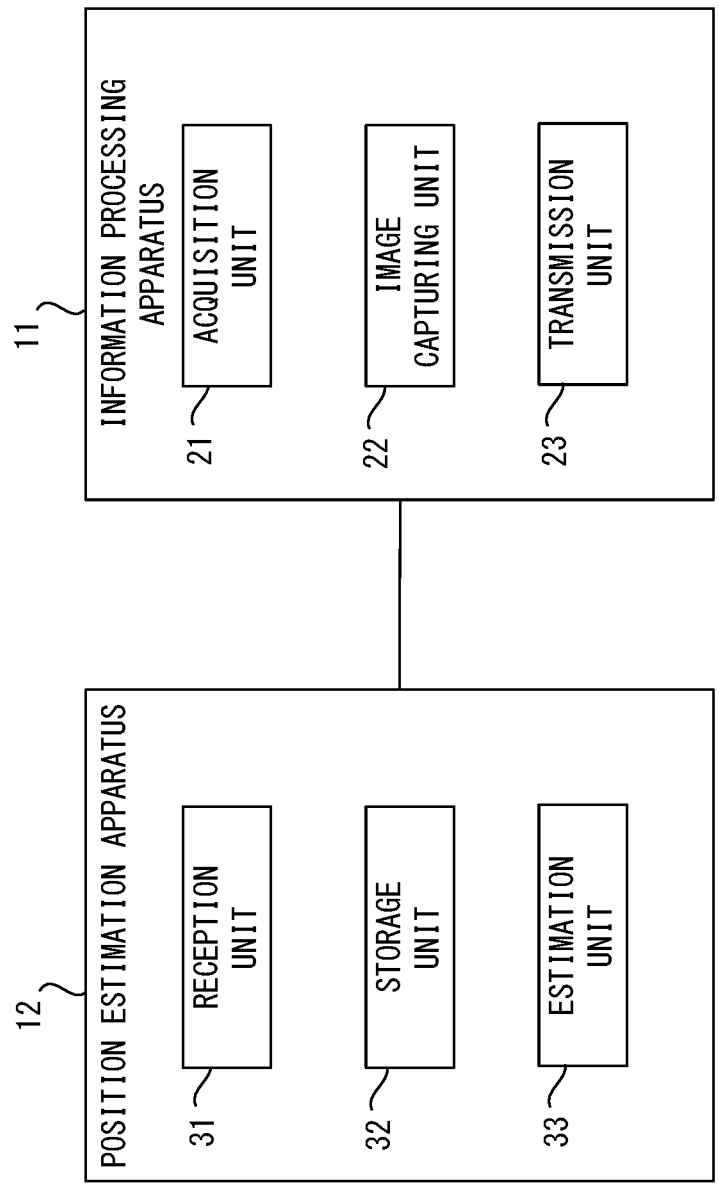
F I G. 1

| SCENE ID | POSITION INFORMATION | FEATURE INFORMATION |
|---|---|---|
| ID1 | P1 | F1 |
| ID2 | P2 | F2 |
| ⋮ | ⋮ | ⋮ |

F I G. 3

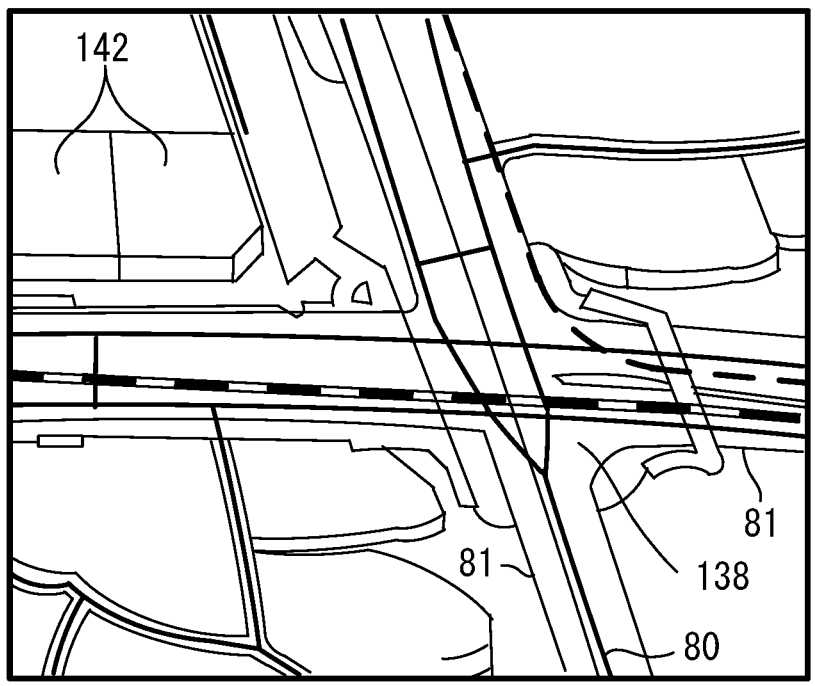
F I G. 1 1

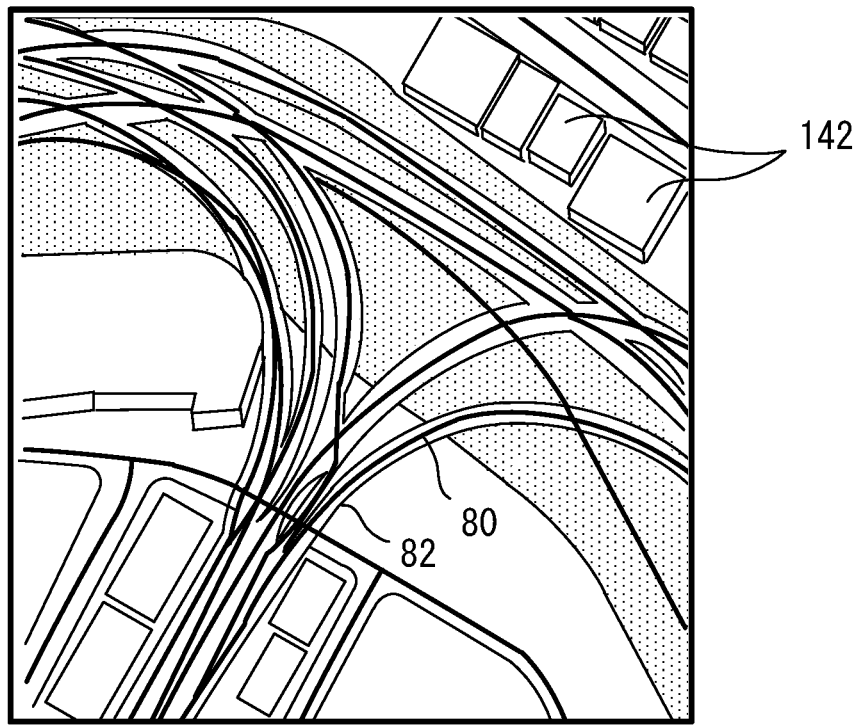
F I G. 1 4

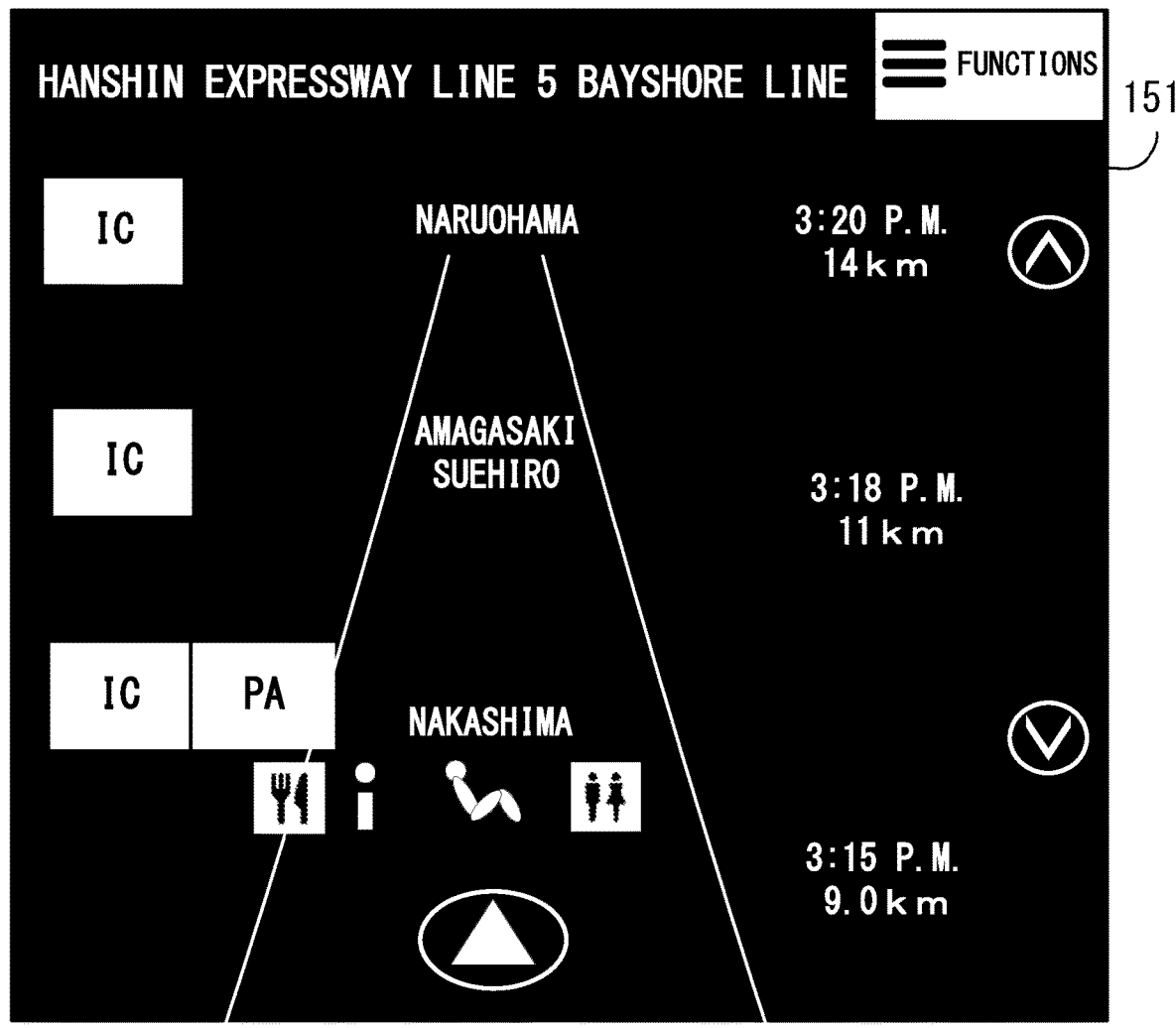
F I G. 1 6

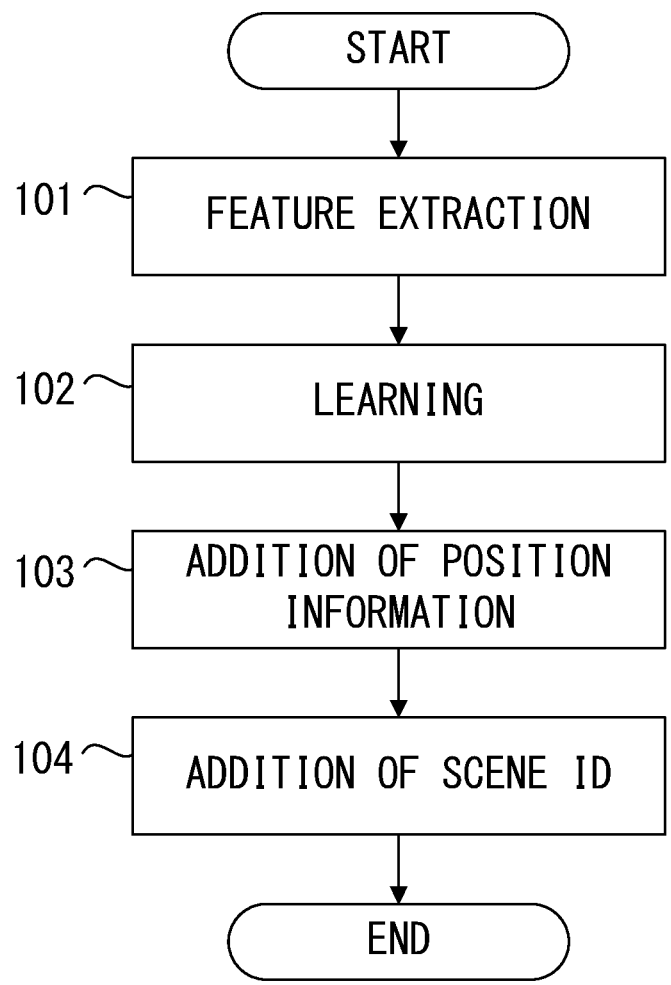
F I G. 1 8

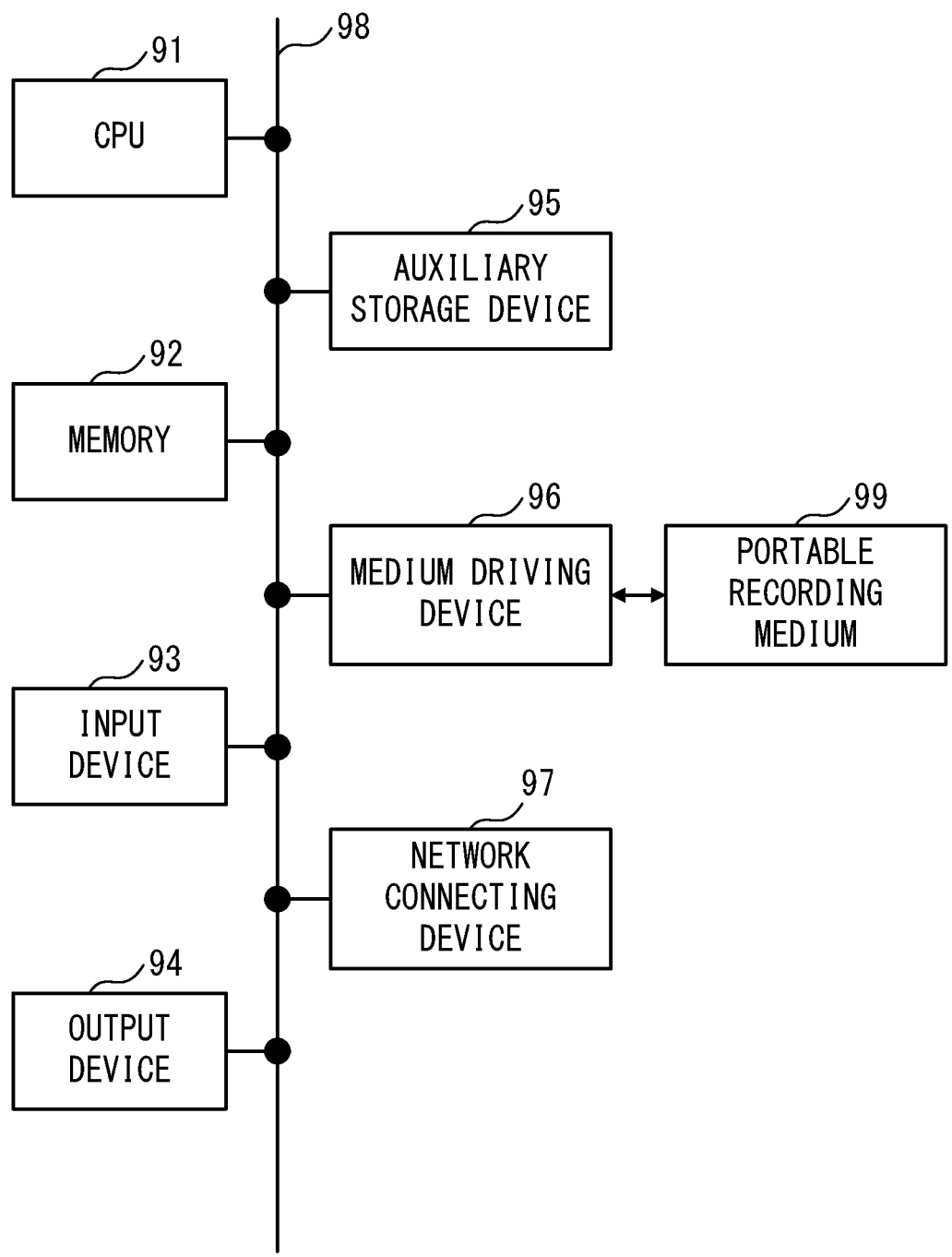
F I G. 2 1

POSITION ESTIMATION SYSTEM AND POSITION ESTIMATION METHOD

CROSS-REFERENCE TO RELATED APPLICATION

This application is based upon and claims the benefit of priority of the prior Japanese Patent Application No. 2019-185771, filed on Oct. 9, 2019, the entire contents of which are incorporated herein by reference.

FIELD

The embodiments discussed herein are related to a position estimation system and a position estimation method.

BACKGROUND

A known position identification apparatus accurately identifies the position of a moving body such as a vehicle by using video captured by the moving body (see, for example, patent document 1). The position identification apparatus in patent document 1 creates travel route data from images of areas to the left and right of a vehicle captured by a vehicle-installed camera and compares the created travel route data with environmental map data so as to associate blocks with each other, thereby identifying the position of the vehicle.

Patent Document 1: Japanese Laid-open Patent Publication No. 2016-143364

SUMMARY

According to an aspect of the embodiments, a position estimation system includes an acquisition circuit, a memory, and a processor. The acquisition circuit acquires first position information indicating a position and a first image captured by a camera at the position indicated by the first position information.

The memory stores second position information indicating a prescribed position on a map and feature information extracted from a second image corresponding to the prescribed position. The second position information is associated with the feature information extracted from the second image. The processor estimates the position indicated by the first position information on the basis of the second position information in the case that the position indicated by the first position information falls within a prescribed range from the prescribed position indicated by the second position information and the first image corresponds to the feature information extracted from the second image.

BRIEF DESCRIPTION OF DRAWINGS

FIG. 1 is a functional configuration diagram of a position estimation system according to the present embodiment;

FIG. 3 illustrates a feature database according to the present embodiment;

FIG. 11 illustrates a wide intersection according to the present embodiment;

FIG. 14 illustrates vertical branching in a congested expressway according to the present embodiment;

FIG. 16 illustrates an expressway chart according to the present embodiment;

FIG. 18 is a flowchart of a feature-database generation process according to the present embodiment;

FIG. 21 is a hardware configuration diagram of an information processing apparatus according to the present embodiment.

DESCRIPTION OF EMBODIMENTS

Figure 2:
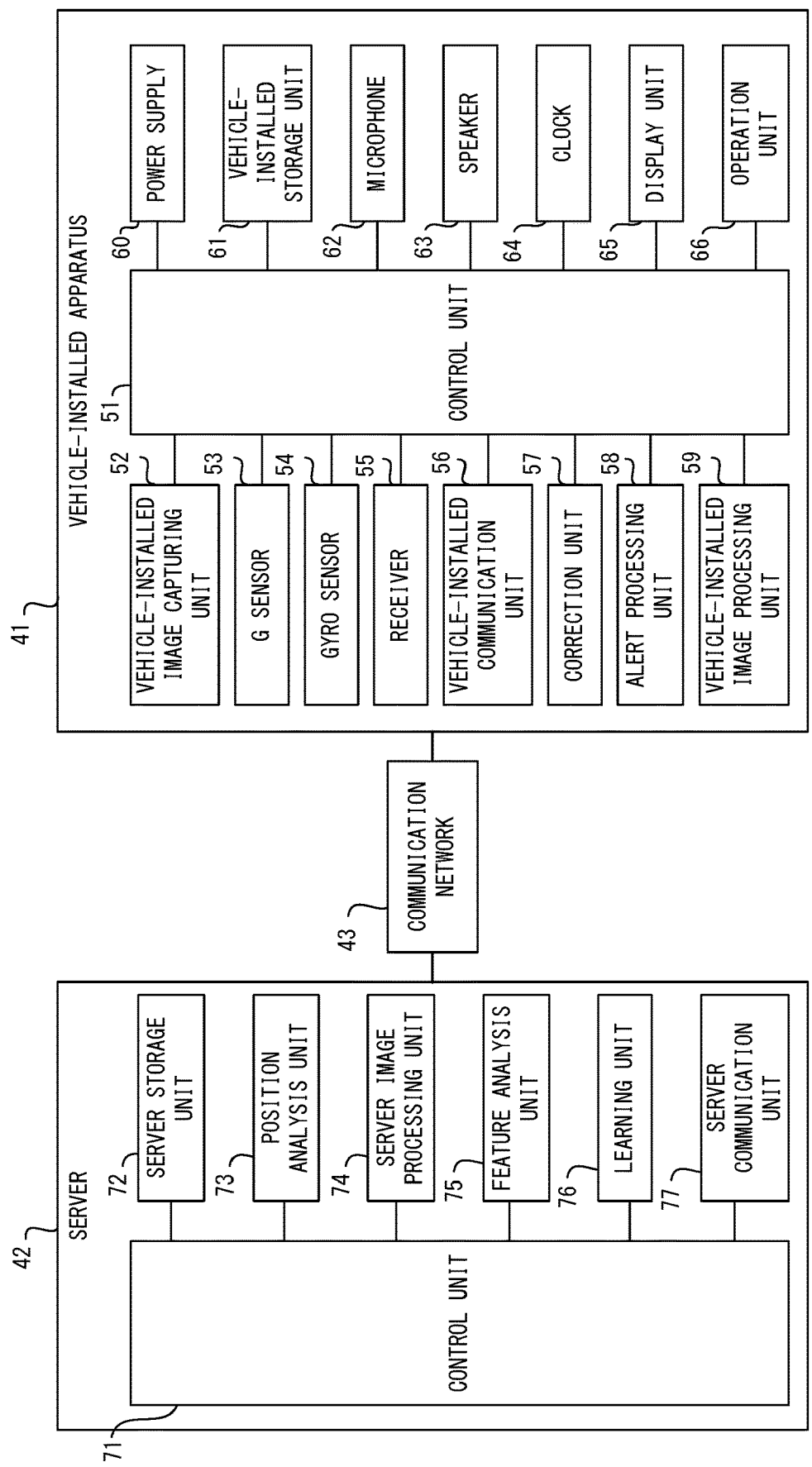
FIG. 2 is a functional configuration diagram illustrating a specific example of a position estimation system according to the present embodiment.

The following describes embodiments by referring to the drawings.

The position identification apparatus in patent document 1 involves a long processing time for creating travel route data from images captured by a vehicle-installed camera.

Such a problem occurs not only when identifying the position of a vehicle from an image captured by a vehicle-installed camera but also when estimating the position of an information processing apparatus of any type such as a vehicle-installed apparatus or a portable terminal apparatus from an image captured by the information processing apparatus.

FIG. 1 illustrates an example of the functional configuration of a position estimation system in accordance with an embodiment. The position estimation system in FIG. 1 includes an information processing apparatus 11 and a position estimation apparatus 12.

The information processing apparatus 11 includes an acquisition unit 21, an image capturing unit 22, and a transmission unit 23. The acquisition unit 21 acquires first position information indicating the position of the information processing apparatus 11. The acquisition unit 21 may be an acquisition circuit. The image capturing unit 22 captures a first image at the position indicated by the first position information. The transmission unit 23 transmits the first position information and the first image to the position estimation apparatus 12. The transmission unit 23 may be a transmission circuit.

The position estimation apparatus 12 includes a reception unit 31, a storage unit 32, and an estimation unit 33. The reception unit 31 receives the first position information and the first image from the information processing apparatus 11. The reception unit 31 may function as an acquisition unit in the position estimation system. The reception unit 31 maybe a reception circuit. The storage unit 32 stores second position information indicating a prescribed position on a map and feature information extracted from a second image corresponding to the prescribed position. The second position information is associated with the feature information. The estimation unit 33 obtains an estimated position for the information processing apparatus on the basis of the second position information in the case that the prescribed position indicated by the second position information falls within a prescribed range from the position indicated by the first position information and the first image corresponds to the feature information.

The position estimation system in FIG. 1 allows the position of an information processing apparatus that is moving to be estimated efficiently from an image captured by the information processing apparatus.

FIG. 2 illustrates a specific example of the position estimation system depicted in FIG. 1. The position estimation system in FIG. 2 includes a vehicle-installed apparatus 41 and a server 42. The vehicle-installed apparatus 41 corresponds to the information processing apparatus 11 in FIG. 1. The vehicle-installed apparatus 41 may be installed in, for example, a vehicle that travels on the road. For example, the vehicle-installed apparatus 41 may be a combination of a vehicle traveling data recorder and a navigation apparatus, a vehicle traveling data recorder having a navigation function, or a camera-equipped navigation apparatus. The server 42 corresponds to the position estimation apparatus 12 in FIG. 1.

The vehicle-installed apparatus 41 and the server 42 can communicate over a communication network 43. For example, the communication network 43 may include a dedicated vehicle-installed communication apparatus installed in a telematics control unit (TCU) or a communication apparatus provided on the road. The vehicle-installed apparatus 41 and the communication apparatus on the road can communicate via a bidirectional radio communication.

The vehicle-installed apparatus 41 includes a control unit 51, a vehicle-installed image capturing unit 52, a G sensor 53, a gyro sensor 54, a receiver 55, a vehicle-installed communication unit 56, a correction unit 57, an alert processing unit 58, and a vehicle-installed image processing unit 59. For example, the receiver 55 may include a global positioning system (GPS) receiver. In addition, the vehicle-installed apparatus 41 includes a power supply 60, a vehicle-installed storage unit 61, a microphone 62, a speaker 63, a clock 64, a display unit 65, and an operation unit 66. The G sensor 53, the gyro sensor 54, and the receiver 55 correspond to the acquisition unit 21 in FIG. 1. For example, the receiver 55 may use a GPS receiver. The vehicle-installed image capturing unit 52 and the vehicle-installed communication unit 56 respectively correspond to the image capturing unit 22 and the transmission unit 23.

The server 42 includes a control unit 71, a server storage unit 72, a position analysis unit 73, a server image processing unit 74, a feature analysis unit 75, a learning unit 76, and a server communication unit 77. The server communication unit 77 and the server storage unit 72 respectively correspond to the reception unit 31 and the storage unit 32 in FIG. 1. The position analysis unit 73 and the feature analysis unit 75 correspond to the estimation unit 33.

The power supply 60 in the vehicle-installed apparatus 41 supplies power to the vehicle-installed apparatus 41. The vehicle-installed storage unit 61 stores map information. Map information includes a map including roads and information pertaining to a road network. The road network includes nodes and links each linking two nodes. A node indicates, for example, a nodal point representing the road network, such as an intersection on the map. A link indicates, for example, a road section between two nodes. A road network represented by nodes and links has a simplified shape of an actual road on the map. The display unit 65 displays the map indicated by the map information on a screen. A road network is obtained by simplifying an actual road, and thus there tends to be a difference between the shape of the actual road and the shape of the road network indicated by nodes and links.

The microphone 62 acquires and outputs sounds inside or outside the vehicle to the control unit 51. The speaker 63 outputs sounds indicating an instruction or a message for a driver, i.e., a user. The clock 64 outputs the current time to the control unit 51. The control unit 51 may be configured to be capable of obtaining the current time not only from the clock 64 but also from the receiver 55 or the vehicle-installed communication unit 56. The operation unit 66 is configured to be capable of accepting an operation input from the driver.

The vehicle-installed image capturing unit 52 is a camera that includes an imaging element. For example, the imaging element may be a charge-coupled device (CCD) or a complementary metal-oxide-semiconductor (CMOS). The vehicle-installed image capturing unit 52 captures a video of, for example, roads or objects located in the vicinity of the vehicle. The vehicle-installed image capturing unit 52 is configured to be capable of outputting the captured video to the control unit 51. The video includes a plurality of time-series images. The vehicle-installed image capturing unit 52 may output captured video as is to the control unit 51 or may output only a prescribed image of the video to the control unit 51. The G sensor 53 measures and outputs an acceleration to the control unit 51. The gyro sensor 54 measures and outputs an angular velocity to the control unit 51. The receiver 55 receives a positioning signal from a positioning satellite. The receiver 55 generates position information indicating a vehicle position using the received positioning signal and outputs the generated information to the control unit 51. The receiver 55 is an example of a position sensor. For example, the receiver 55 may form a portion of a satellite positioning system.

The control unit 51 stores the video output from the vehicle-installed image capturing unit 52 and the position information output from the receiver 55 in the vehicle-installed storage unit 61. In addition, the control unit 51 stores the acceleration output from the G sensor 53, the angular velocity output from the gyro sensor 54, the sounds output from the microphone 62, and the current time output from the clock 64 in the vehicle-installed storage unit 61.

The vehicle-installed image processing unit 59 applies prescribed image processing to images included in the video for individual times so as to generate clearer images. The vehicle-installed image processing unit 59 can convert a captured video into a clearer video in consideration of conditions such as backlight, night-time, and rainy weather.

The vehicle-installed communication unit 56 transmits images forming the video and the position information to the server 42. In addition to the images and the position information, the vehicle-installed communication unit 56 can transmit the acceleration, the angular velocity, time information, image capturing conditions, and vehicle information to the server 42. Time information includes, for example, image shooting times for the images included in the video and acquisition times for the acceleration, the angular velocity, and the position information. Image capturing conditions include, for example, the angular field of view of the vehicle-installed image capturing unit 52 and the resolution of the imaging element. Vehicle information is identification information of the vehicle.

The server storage unit 72 stores a feature database and a learning model. The learning unit 76 performs a learning process for feature information extracted from images in advance so as to generate the feature database and the learning model and stores the generated database and model in the server storage unit 72. Images used for the learning process include images of scenery that have been captured for the same spot in various directions.

A prescribed object is presented in images used for the learning process, and feature information of the object extracted from the images is registered in the feature database. For example, the prescribed object may be a building or a civil engineering structure that can be observed on the road. The learning model receives the feature information registered in the feature database and an unknown image as inputs and outputs the probability of the object indicated by the feature information being presented in the unknown image.

FIG. 3 illustrates an example of the feature database. A scene ID, position information, and feature information are associated with each other and registered in each entry of the feature database in FIG. 3. The scene ID is identification information of an image used in the learning process, and the position information indicates a position at which the image of the object was captured. The feature information indicates an image feature extracted from the image.

For example, feature information may be a histograms-of-oriented-gradients (HOG) feature amount or a scaled-invariance-feature-transform (SIFT) feature amount. Feature information may be a speeded-up-robust-features (SURF) feature amount, a binary-robust-independent-elementary-features (BRIEF) feature amount, or saliency.

For example, the server communication unit 77 may receive the video, the acceleration, the angular velocity, the position information, the time information, the image capturing conditions, and the vehicle information from the vehicle-installed apparatus 41. The control unit 71 stores the information received by the server communication unit 77 in the server storage unit 72. For example, the server image processing unit 74 can normalize each image included in the video by changing the format and resolution of the image.

The feature analysis unit 75 searches the feature database stored in the server storage unit 72 by using position information acquired at a time at which each image was captured. The feature analysis unit 75 extracts one or more entries. The extracted entry includes position information indicating a position within a prescribed range from the position indicated by the acquired position information.

Next, for each of the extracted entries, the feature analysis unit 75 inputs the feature information included in the entry and an image included in the video to the learning model so as to obtain the probability of the object indicated by the feature information being presented in the image. The feature analysis unit 75 compares the obtained probability with a prescribed threshold. When the probability is greater than the prescribed threshold, the feature analysis unit 75 determines that the image corresponds to the feature information. The prescribed threshold may be set, as appropriate, such that images can be distinguished from each other using feature information.

When it is determined that the image corresponds to the feature information, the position analysis unit 73 obtains an estimated position for the vehicle from the position information included in the same entry as the feature information. For example, the position analysis unit 73 can calculate, by using the received image capturing conditions, a relative distance and a relative direction between the image capturing position for the object that is indicated by the position information and the position of the vehicle-installed image capturing unit 52 in the vehicle-installed apparatus 41, thereby obtaining an estimated position for the vehicle.

In addition, the position analysis unit 73 can store the estimated position in the server storage unit 72. For example, the server storage unit 72 can enhance the accuracy of calculation of the relative distance and the relative direction by using an estimated position stored in advance.

The position analysis unit 73 generates an estimation result. The estimation result includes the scene ID of the entry and corrected position information indicating the estimated position. The server communication unit 77 transmits the estimation result to the vehicle-installed apparatus 41.

The vehicle-installed communication unit 56 in the vehicle-installed apparatus 41 receives the estimation result from the server 42. The correction unit 57 runs a map matching function using the corrected position information included in the estimation result.

The map matching function is a process of correcting, to a position on the road network, a position indicated by position information when this position does not match any of the nodes or links included in the road network. The map matching function is such that the position indicated by position information is compared with the nodes or links so as to determine a position on any of the nodes or links as a corrected position.

The correction unit 57 runs the map matching function to correct the position indicated by the corrected position information to a position on a node or link located within a prescribed range from the position before the correction. The display unit 65 displays the position after the correction on the map.

The correction unit 57 can also use the position indicated by the corrected position information as a vehicle position by suppressing application of the map matching function to the corrected position information. When the correction unit 57 suppresses application of the map matching function to the corrected position information, the display unit 65 displays the position indicated by the corrected position information on the map.

The alert processing unit 58 implements safety driving assistance by performing, for example, lane departure monitoring, preceding-vehicle approach sensing, or speed monitoring using the video captured by the vehicle-installed image capturing unit 52. The alert processing unit 58 generates alert information indicating that the vehicle is traveling in a state of risk. The display unit 65 displays the alert information on the screen. The alert processing unit 58 may generate alert information indicating that the image included in the video is unsuitable to have the map matching function run therefor. For example, images that are unsuitable to have the map matching function run therefor may be a video obtained in prescribed bad weather such as heavy rain.

The position estimation system in FIG. 2 does not need to create travel route data from the video captured by the vehicle-installed apparatus 41 and allows the position of the vehicle to be estimated in a short time by analyzing the features of images by using the learning model. Thus, even if position information acquired by the receiver 55 has a large error, accurate position information can be obtained with a simpler configuration.

Next, by referring to FIGS. 4-17, descriptions are given of specific examples of spots at which the position estimation system in FIG. 2 can be applied effectively.

Figure 4:
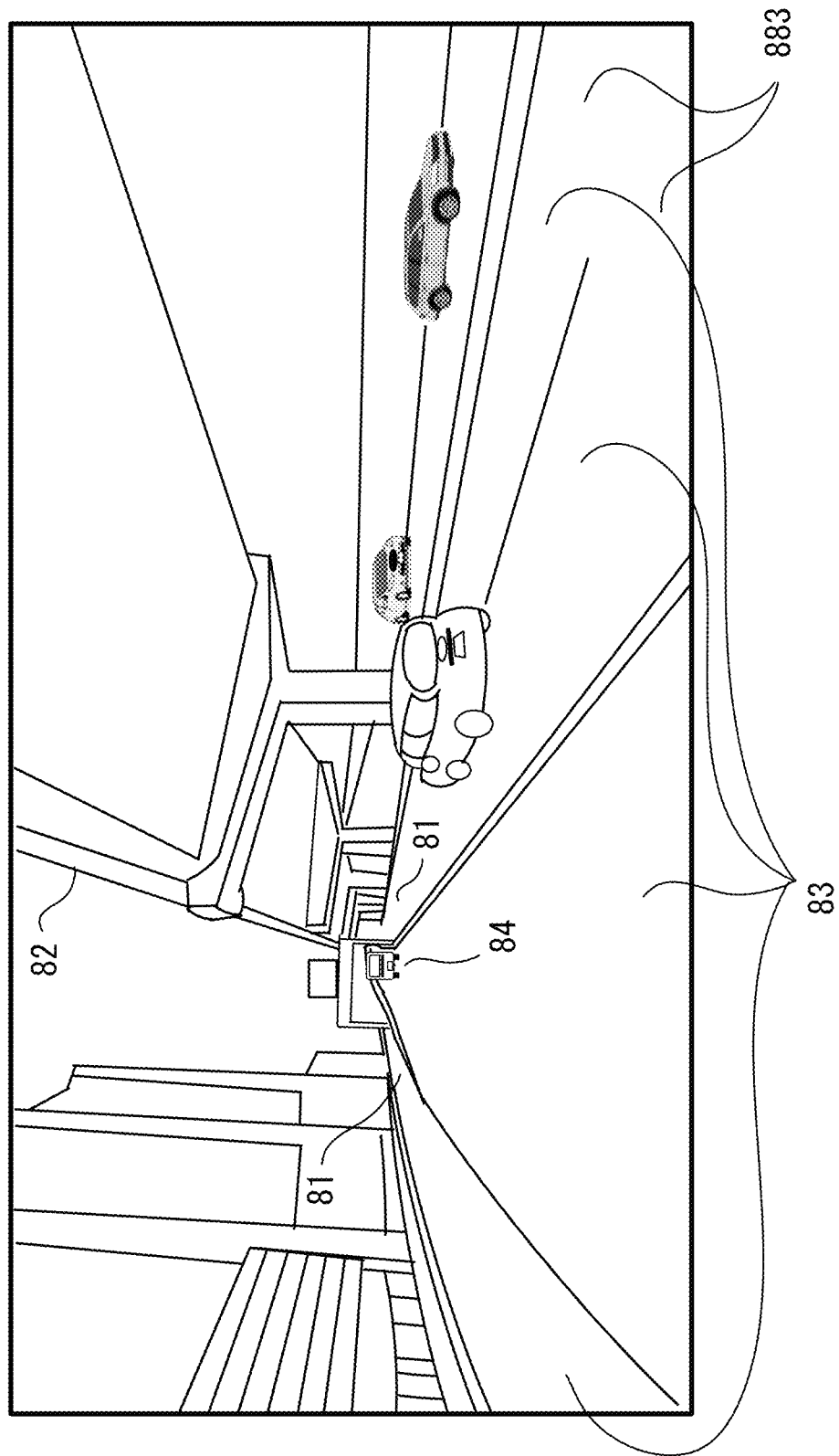
FIG. 4 illustrates branched roads according to the present embodiment.

FIG. 4 illustrates examples of branched roads. In the example of FIG. 4, an elevated expressway 82 extends along general road 81. The general road 81 include four lanes 83 extending side by side. The lanes 83 of the general road 81 are branched along the general road 81. The general road 81 depicted in FIG. 4 is shaped to include a portion divided into a central automobile road 84 and general roads 81 on both sides of the central automobile road 84.

Figure 5:
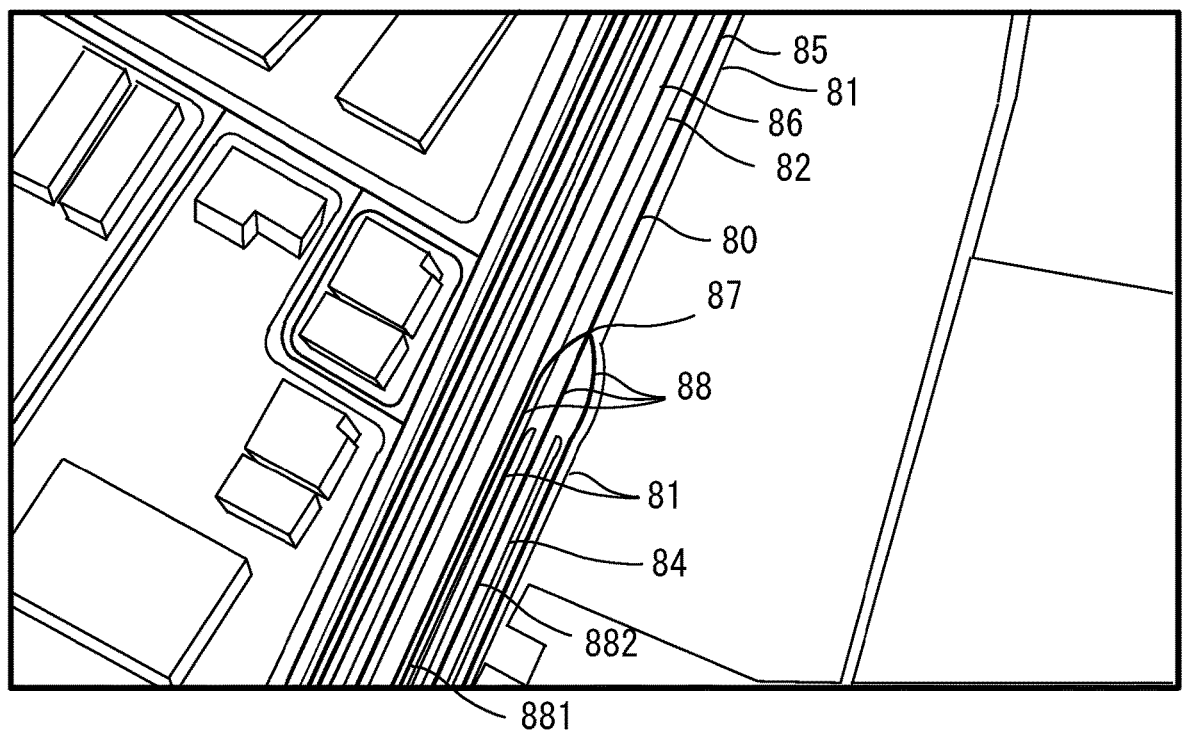
FIG. 5 is a plan view of branched roads according to the present embodiment.

FIG. 5 illustrates an example of a plan view of the branched roads in FIG. 4. In FIG. 5, a first network 85 represents nodes and links in the general road 81 in the road network. The following descriptions are given with reference to a road network 80. In FIG. 5, a second network 86 represents nodes and links in the expressway 82.

The shape of the first network 85 is simpler than that of the general roads 81 that include four lanes 83 extending side by side. The first network 85 is divided into three links 88 at a node 87. The three links 88 exemplify a road linked to the central automobile road 84 and the general roads 81 on different lanes 83 that extend on both sides of the central road. A link 88 (881) overlapping the expressway 82 among the three links 88 exemplifies the general road 81 on the lane 83 (883) extending below the expressway 82. A navigation apparatus that simply implements a map matching function could acquire incorrect position information at the vicinity of the node 87, and once a link (88) (882) linked to the automobile road 84 is set by the map matching function, an incorrect traveling position could possibly be displayed for several hundreds of meters.

The information processing apparatus 11 in the embodiment runs the map matching function by using corrected position information so that, even in the simple first network 85, the traveling position can be displayed on the correct link 88 with a high probability.

Figure 6:
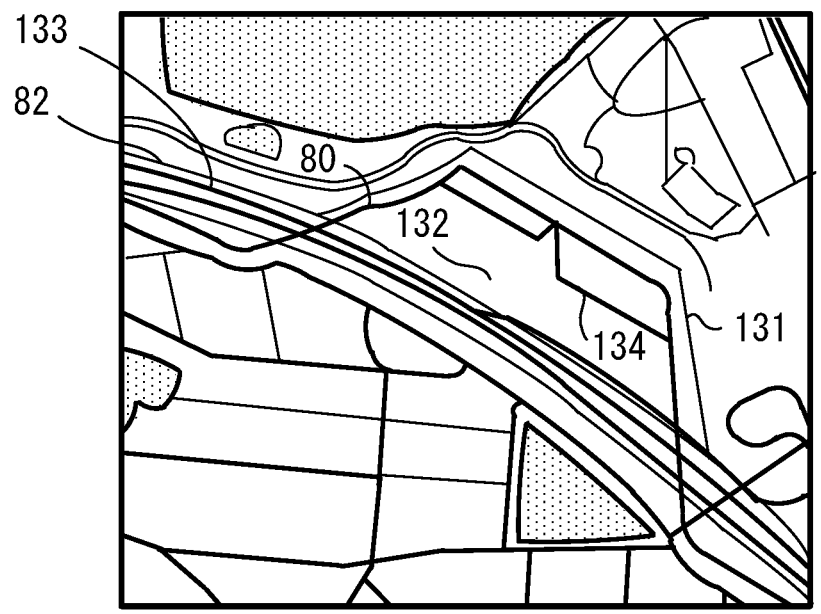
FIG. 6 illustrates an expressway service area according to the present embodiment.

FIG. 6 illustrates a service area 131 on the expressway 82. In the example of FIG. 6, the service area 131, which is irregular-shaped, is provided on the side of the expressway 82. In FIG. 6, a third network 133 represents nodes and links in the expressway 82 in the road network 80. In FIG. 6, a fourth network 134 represents nodes and links in a parking lot 132 provided within the service area 131.

The vehicle can travel freely on sites other than the fourth network 134 in the parking lot 132 provided within the service area 131, and thus a position gap tends to occur between the actual traveling position and a traveling position displayed using the map matching function.

The information processing apparatus 11 in the embodiment suppresses application of the map matching function and uses a position indicated by corrected position information, thereby allowing a correct traveling position to be displayed with a higher probability even for sites other than the fourth network 134.

Figure 7:
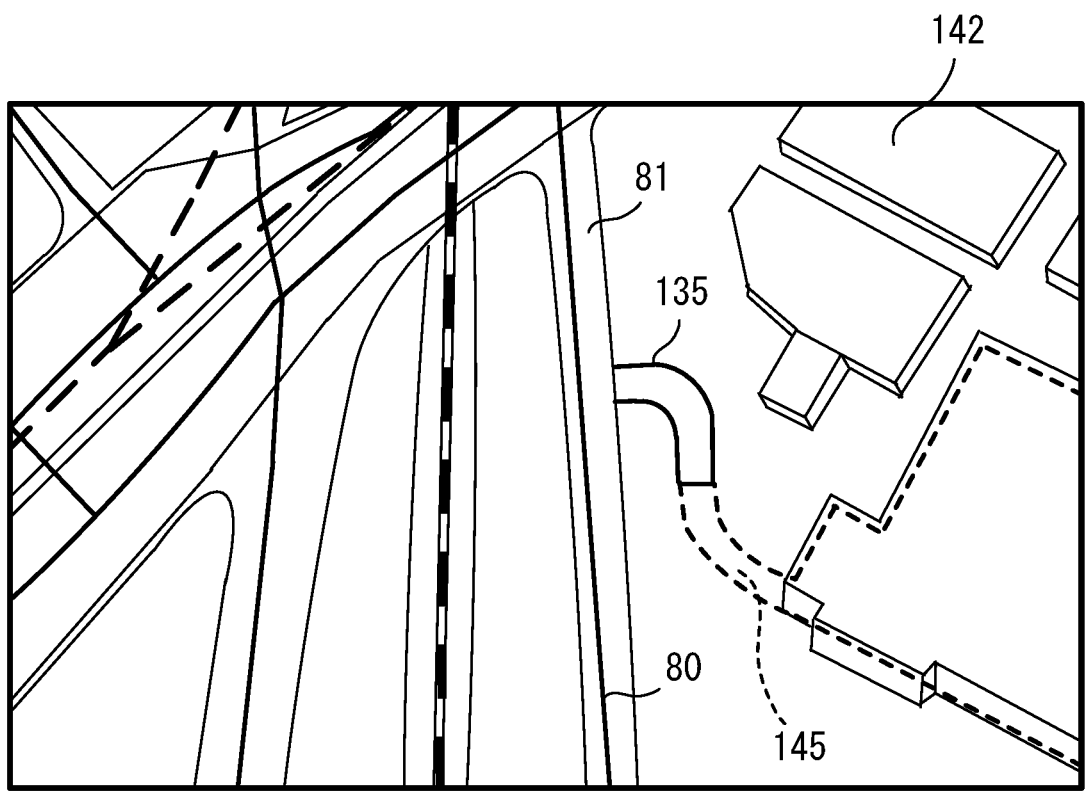
FIG. 7 illustrates a slope in a basement parking lot according to the present embodiment.

FIG. 7 illustrates an example of a slope 135 in a basement parking lot 145. With respect to typical parking lots on the ground, the exit of the parking lot is directly connected to the road. Unlike in parking lots on the ground where the exit is directly connected to the road, it is difficult to receive a positioning signal in the basement parking lot 145 connected to the road via the mortar-shaped slop 135. As a general rule, when using sensor information from a G sensor or a gyro sensor instead of positioning signals, a navigation apparatus tends to have accumulated errors in the sensor information. In addition, although the navigation apparatus can receive a positioning signal on the mortar-shaped slope 135, position information acquired from the positioning signal also includes an error. The navigation apparatus tends to display an incorrect traveling position. The navigation apparatus could take, for example, about 20-30 seconds to correct the incorrect traveling position.

The information processing apparatus 11 in the embodiment suppresses application of the map matching function and uses a position indicated by corrected position information, thereby allowing a correct traveling position to be displayed with a higher probability.

Figure 8:
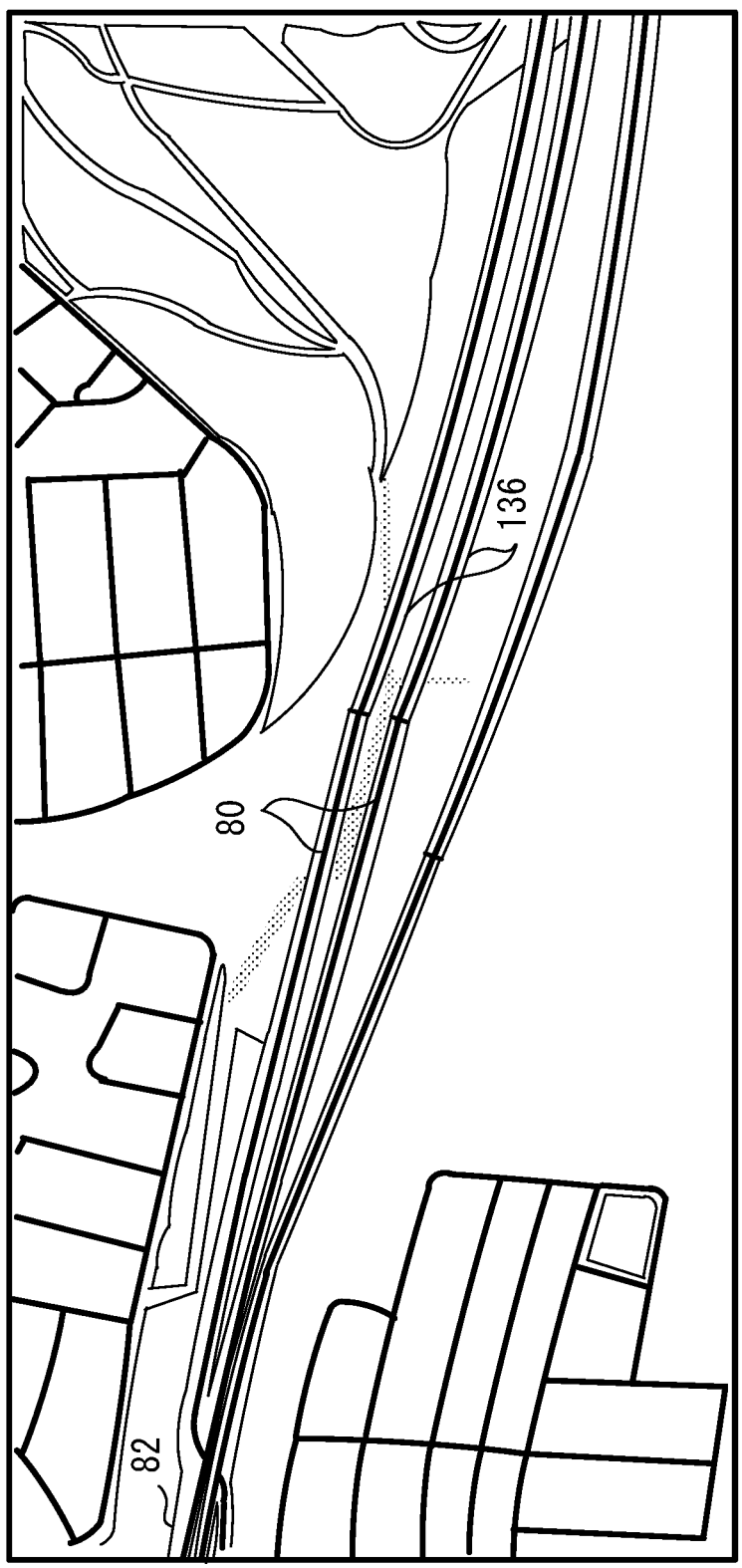
FIG. 8 illustrates a tunnel according to the present embodiment.

FIG. 8 illustrates an example of a tunnel 136. With respect to an expressway 82 that includes lanes 83 extending side by side and then branched, when entering the tunnel 136 by passing a position where the accuracy of position information acquired from a positioning signal is enhanced, it will be difficult to receive a positioning signal within the tunnel 136. When it is difficult to receive a positioning signal within the tunnel 136, a navigation apparatus that simply implements a map matching function could display the traveling position on an incorrect road network 80 while the vehicle is traveling no shorter than 1 km.

The information processing apparatus 11 in the embodiment implements the map matching function by using corrected position information, thereby allowing the traveling position to be displayed on the correct road network 80 with a higher probability.

Figure 9:
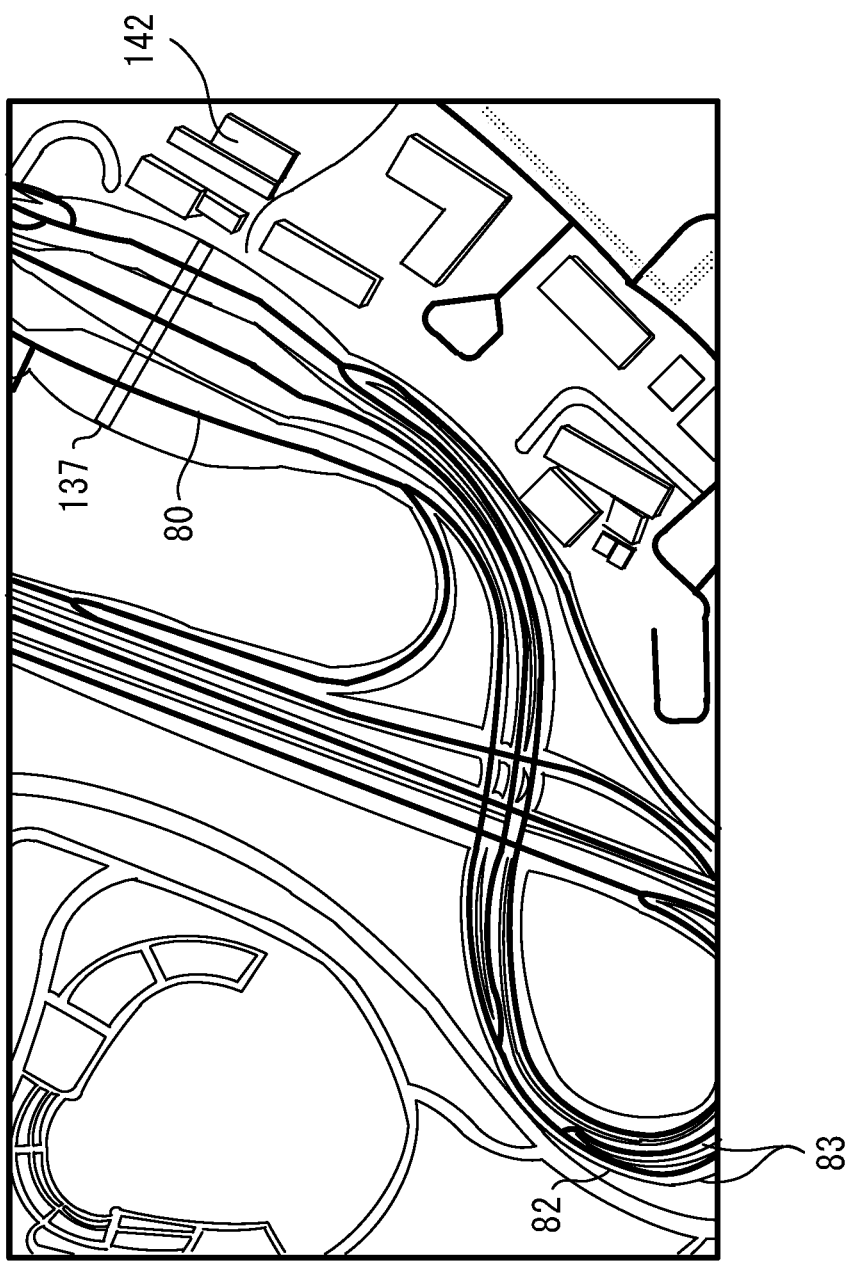
FIG. 9 illustrates merging and diverging according to the present embodiment.

FIG. 9 illustrates examples of merging and diverging. When two lanes 83 in an expressway 82 are merged and then branched along the road, a position gap tends to occur on the roads extending side by side after the branching. In addition, if a tollgate 137 is provided on the road after branching, the vehicle can freely travel on sites other than the links in the vicinity of the tollgate 137, and hence it will be difficult to eliminate the position gap.

When lanes 83 are merged and then branched along the road, the information processing apparatus 11 in the embodiment implements the map matching function by using corrected position information at the branch point and suppresses application of the map matching function in the vicinity of the tollgate 137, thereby allowing the correct traveling position to be displayed with a higher probability.

Figure 10:
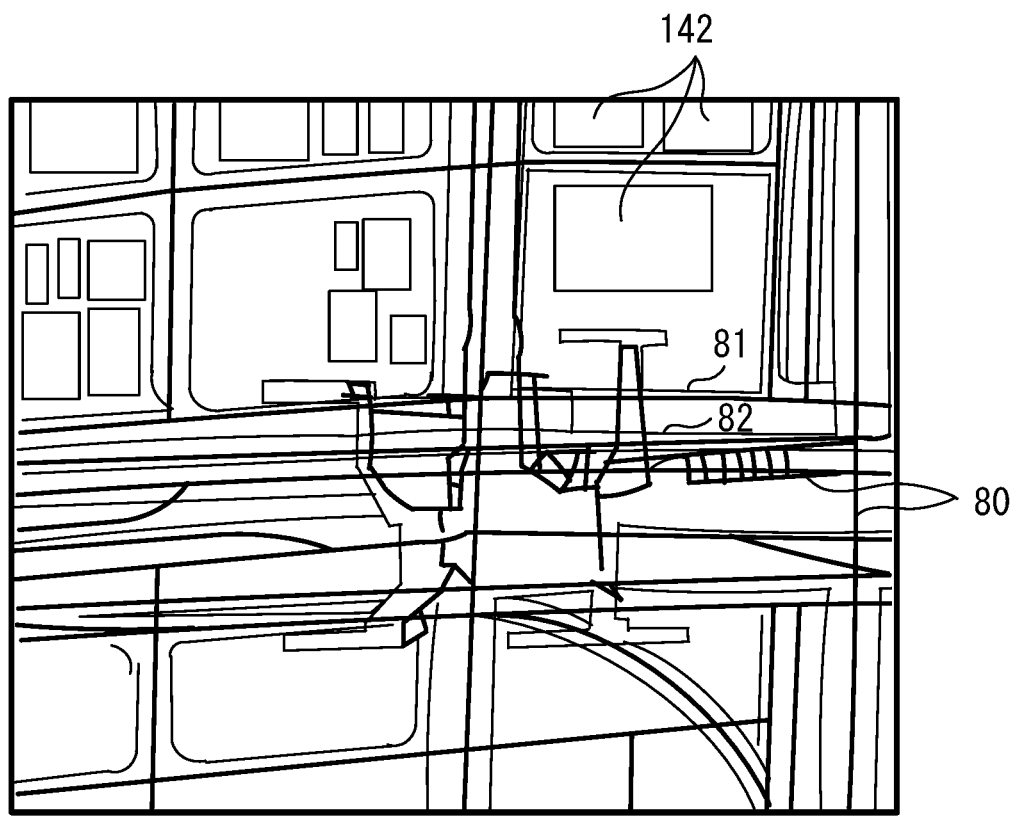
FIG. 10 illustrates vertical branching according to the present embodiment.

FIG. 10 illustrates an example of vertical branching. The accuracy of a positioning signal is decreased in a case where the main road of an elevated expressway 82 that is linked to a bypass and a general road 81 that includes vertically branched sections extend along each other in a high rise building area in which there are buildings 142. In addition, since a map for general road 81 rarely includes gradient data, it will be difficult to distinguish between the main road of the expressway 82 and the general road 81.

Even when it is difficult to distinguish between the main road of a expressway 82 and a general road 81, the information processing apparatus 11 in the embodiment allows the traveling position to be displayed on the correct road network 80 with a higher probability by implementing the map matching function using corrected position information.

FIG. 11 illustrates an example of a wide intersection 138. A position gap tends to occur when only simple links are present in a wide intersection 138 having a shape wherein general roads 81 are connected. For example, only one link may be present for a general road 81 having four lanes.

Figure 12:
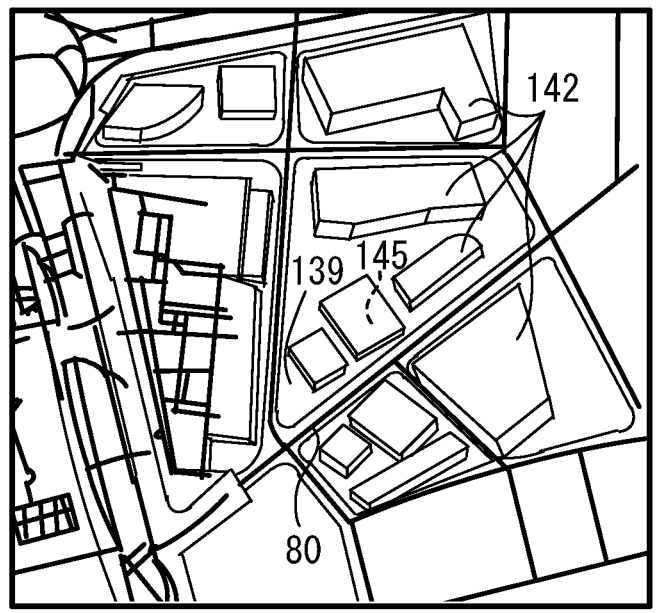
FIG. 12 illustrates a basement parking lot in a high rise building area according to the present embodiment.

When only simple links are present in the road network 80, the information processing apparatus 11 in the embodiment suppresses application of the map matching function and uses a position indicated by corrected position informa- FIG. 12 illustrates an example of a basement parking lot in a high rise building area in which buildings 142 are present. As a general rule, a navigation apparatus, while in a basement parking lot 145 in a high rise building area, has difficulty in receiving a positioning signal and tends to have accumulated errors in sensor information. The navigation apparatus can receive a positioning signal when being positioned in the vicinity of the entrance or exit 139 of the basement parking lot 145, but the traveling position tends to be displayed on an incorrect road when the accuracy of the positioning signal is low and plural roads are present nearby.

While in a basement parking lot 145 in a high rise building area, the information processing apparatus 11 in the embodiment suppresses application of the map matching function and uses a position indicated by corrected position information, thereby allowing a correct traveling position to be displayed with a higher probability.

Figure 13:
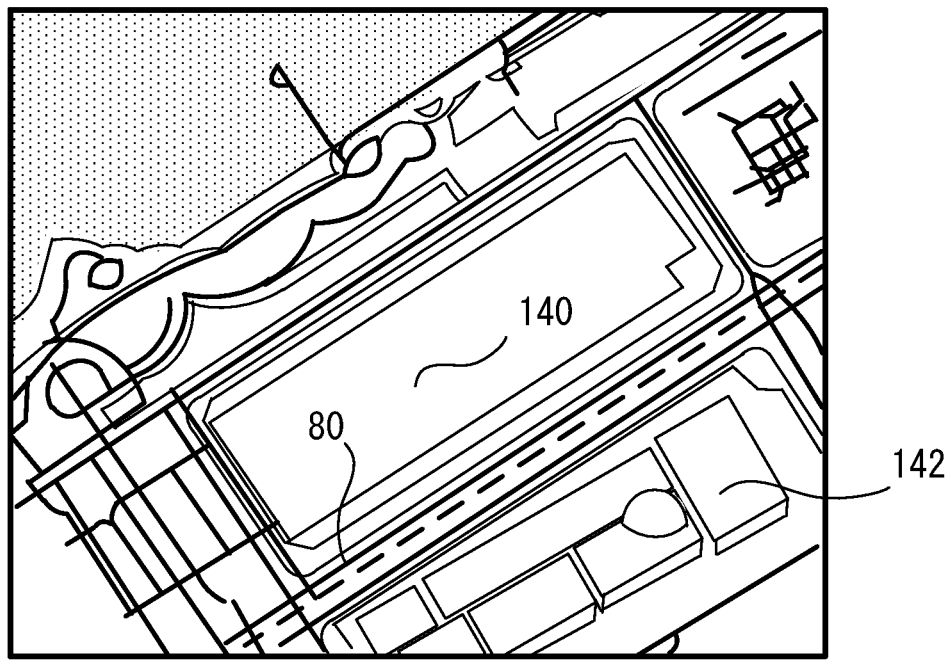
FIG. 13 illustrates a multistory parking lot according to the present embodiment.

FIG. 13 illustrates an example of a multistory parking lot 140. As a general rule, a navigation apparatus, while in a multistory parking lot 140, has difficulty in receiving a positioning signal. The navigation apparatus in the multistory parking lot 140 repeatedly advances and stops at short intervals and thus tends to have accumulated errors in sensor information. Especially when a map for the multistory parking lot 140 is provided with only flags indicating the presence/absence of slopes and no gradient data, a navigation apparatus tends to make errors in sensing as to on which floor in the multistory parking lot 140 the vehicle is traveling. In the case of a structure in which vehicles can move into an adjacent parking facility from a certain floor, navigation apparatuses will have larger difficulty in determining the position.

The information processing apparatus 11 in the embodiment suppresses application of the map matching function and uses a position indicated by corrected position information, thereby allowing a correct traveling position to be displayed with a higher probability.

FIG. 14 illustrates an example of vertical branching in a congested expressway 82. As a general rule, in a case where a multilevel expressway 82 includes vertically branched sections, even when a map includes gradient data, a navigation apparatus tends to have a position gap resulting from accumulation of errors in sensor information when the vehicle frequently advances and stops due to traffic congestion.

Figure 15:
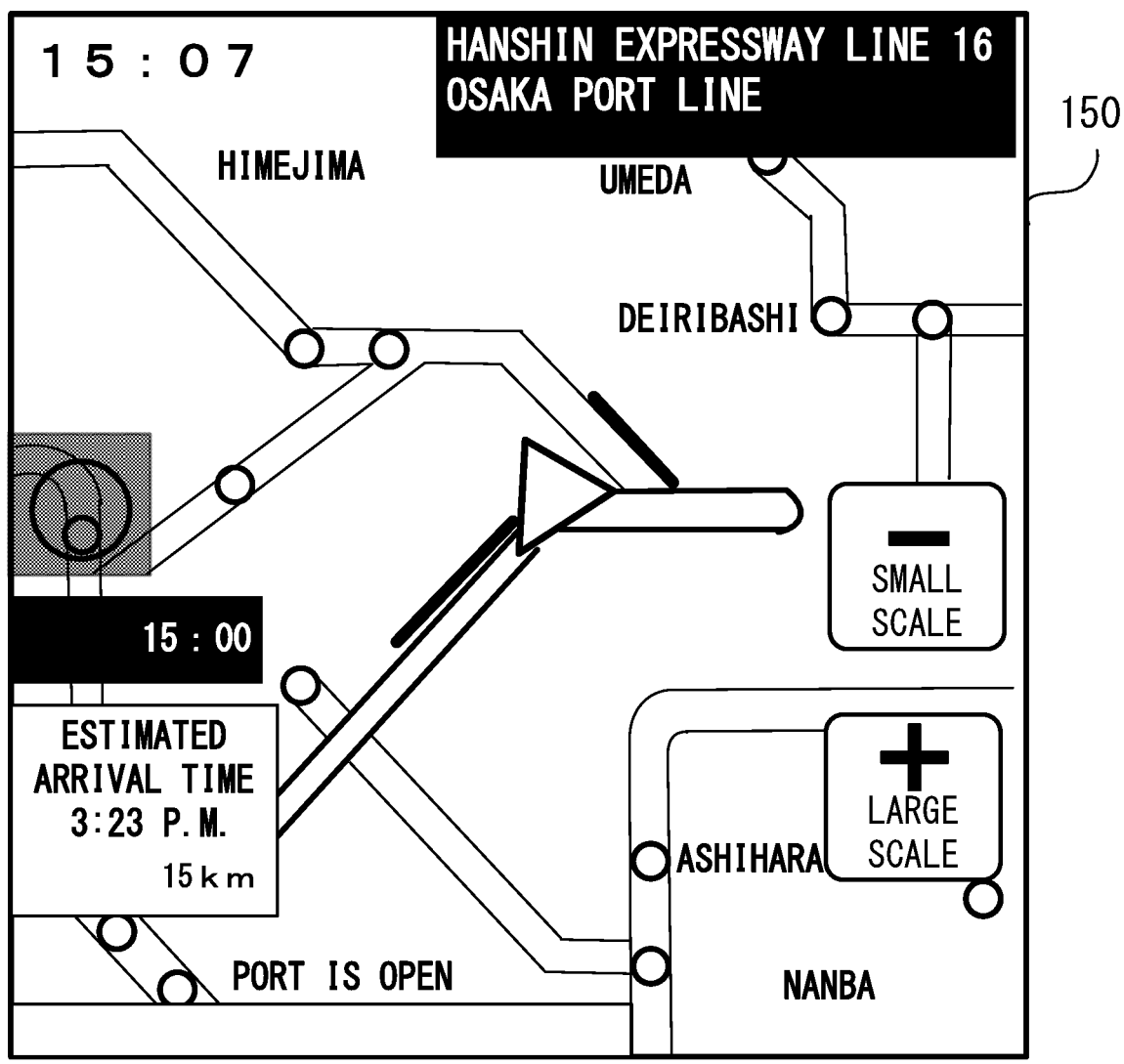
FIG. 15 illustrates a brief expressway map according to the present embodiment.

FIG. 15 illustrates an example of a brief expressway map 150 displayed on the screen of the navigation apparatus. FIG. 16 illustrates an example of an expressway chart 151 displayed on the screen of the navigation apparatus. In a case where an expressway 82 includes vertically branched sections and the brief expressway map 150 in FIG. 15 and the expressway chart 151 in FIG. 16 are concurrently displayed on the screen of the navigation apparatus, when characters or a display position on the brief expressway map 150 changes, the driver easily realizes a position gap.

The information processing apparatus 11 in the embodiments implements the map matching function by using corrected position information, thereby allowing the traveling position to be displayed on the correct road network 80 with a higher probability.

Figure 17:
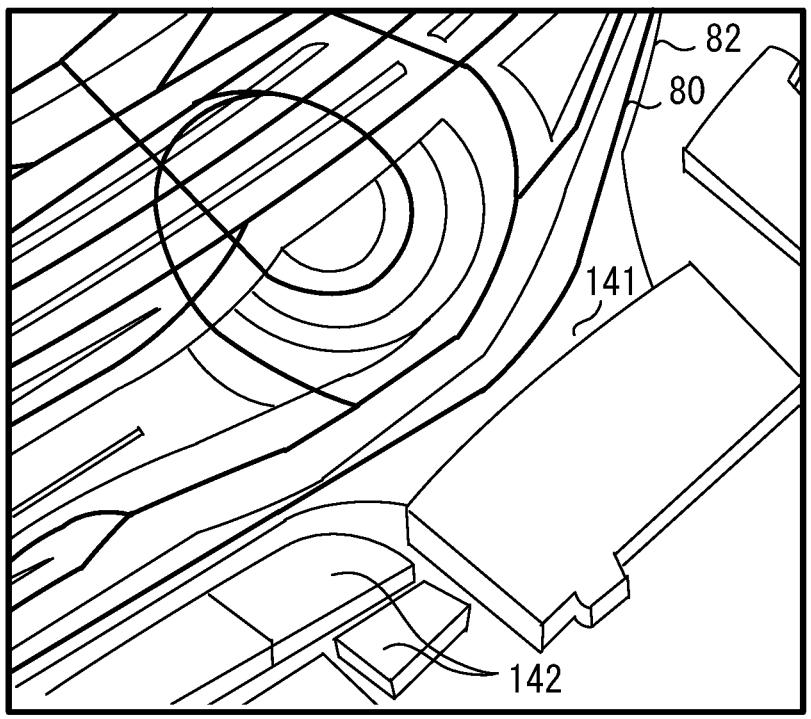
FIG. 17 illustrates a parking area in a grade separation zone according to the present embodiment.

FIG. 17 illustrates an example of a parking area 141 in a grade separation zone. In the parking area 141 in a grade separation zone, the vehicle can freely travel on sites other than the road network 80 and has difficulty in receiving a positioning signal, and thus the navigation apparatus tends to have a position gap.

The information processing apparatus 11 in the embodiments suppresses application of the map matching function and uses a position indicated by corrected position information, thereby allowing a correct traveling position to be displayed with a higher probability even when only the simple road network 80 is provided by the map information.

FIG. 18 is a flowchart illustrating an example of a feature-database generation process performed by the server 42 in FIG. 2. The feature-database generation process in FIG. 18 is such that images of scenery that have been captured for the same spot in various directions are input as teacher data for a learning process. Every image has been normalized and has added thereto a correct answer label and region information designating an image region in which an appropriate object is presented. For example, a scene ID may be used as the correct answer label.

Spots used as teacher data may be those depicted in FIGS. 4-14 and 17 or may be other spots on the map. Even in the case of, for example, spots such as those depicted in FIGS. 4-14 and 17, the information processing apparatus 11 in the embodiment can identify more correct spots in a shorter time than typical navigation apparatuses.

First, the learning unit 76 extracts feature information from an image region designated by region information within each image (101). The learning unit 76 generates a learning model by performing the learning process for images, feature information, and scene IDs (102). For example, machine learning may be used as the learning process, and a neural network, a decision tree, or a support vector machine may be used as the learning model.

Next, the learning unit 76 adds position information indicating the position of the object to the extracted feature information (103). The learning unit 76 also adds a scene ID to the extracted feature information (104). The learning unit 76 registers the feature information to which the position information and the scene ID have been added in the feature database. In this way, an entry in the feature database is generated. The learning unit 76 performs similar processes repeatedly for plural spots, thereby generating various entries and updating the learning model.

A combination of an incorrect answer label and an image in which an object is not presented can be added as teacher data for the learning process. The accuracy of a probability to be output by the learning model can be enhanced by learning the feature information of images to which a correct answer label has been added and the feature information of images to which an incorrect answer label has been added. In comparison with a configuration in which a video captured by the vehicle-installed image capturing unit 52 is compared with an image of a spot stored in advance so as to identify a position, the information processing apparatus 11 in the embodiment can identify a position even when a video captured by the vehicle-installed image capturing unit 52 and an image of a spot stored in advance are different for some reason related to the orientation of the vehicle. In addition, the information processing apparatus 11 in the embodiment can perform the machine learning using a learning model so as to estimate a particular location from an acquired image even when, for example, a building or some advertising signs nearby have been changed.

Figure 19:
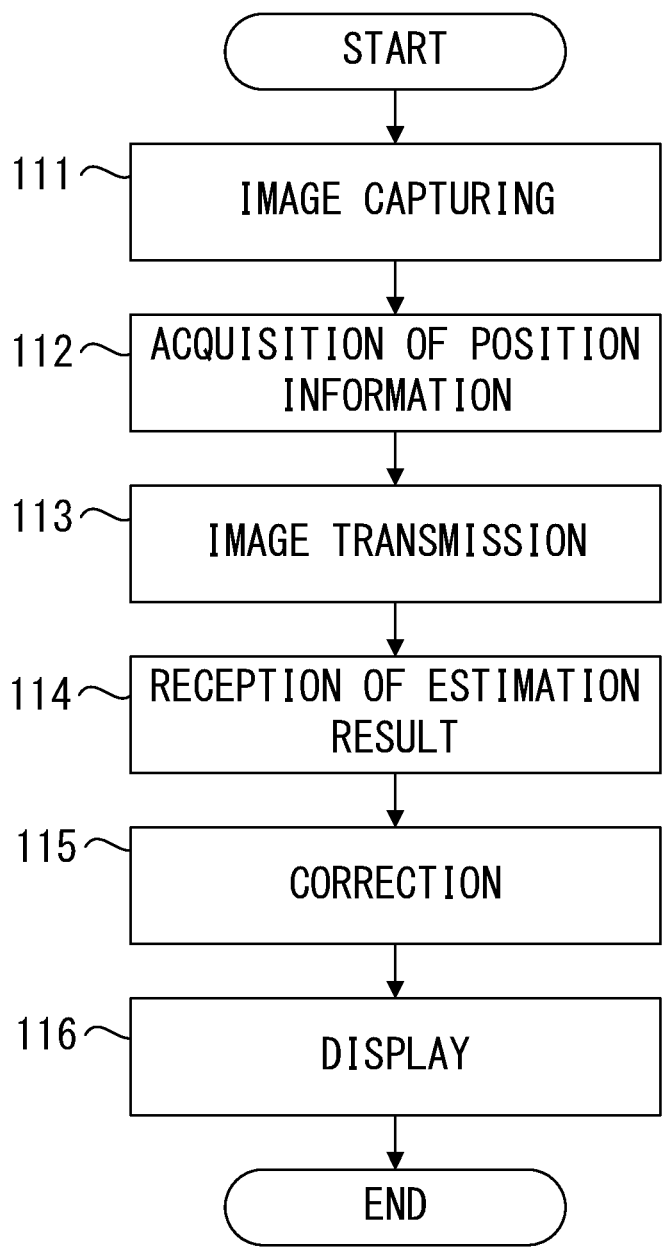
FIG. 19 is a flowchart of a position display process according to the present embodiment.

FIG. 19 is a flowchart illustrating an example of a position display process performed by the vehicle-installed apparatus 41 in FIG. 2. First, the vehicle-installed image capturing unit 52 captures an image of scenery in the vicinity of the vehicle (111). The receiver 55 acquires position information from a positioning signal (112). The G sensor 53 measures an acceleration. The gyro sensor 54 measures an angular velocity.

Next, the vehicle-installed communication unit 56 transmits the image, the acceleration, the angular velocity, the position information, time information, image capturing conditions, and vehicle information to the server 42 (113). The vehicle-installed communication unit 56 receives an estimation result from the server 42 (114).

Next, the correction unit 57 implements the map matching function using corrected position information included in the estimation result so as to correct the position indicated by the position information acquired by the receiver 55 (115). The display unit 65 displays the corrected position on the map as the vehicle position (116). For a prescribed position set in advance, the correction unit 57 may suppress application of the map matching function to the corrected position information and use the position indicated by the corrected position information as is as the vehicle position. For example, the prescribed position set in advance may be a spot represented by a shape in the road network 80 having a prescribed difference or larger from the actual road shape.

Figure 20:
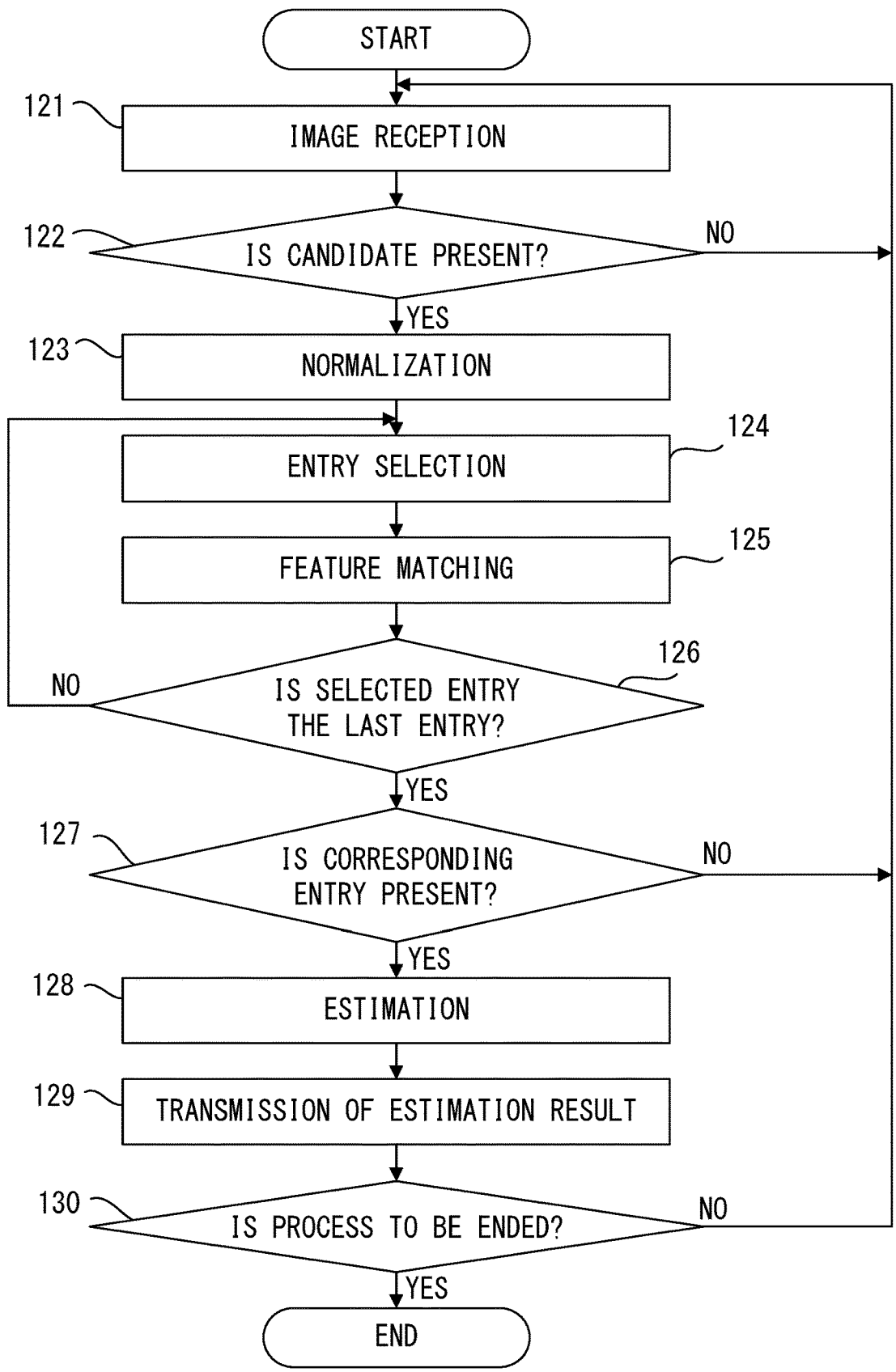
FIG. 20 is a flowchart of a position estimation process according to the present embodiment.

FIG. 20 is a flowchart illustrating an example of a position estimation process performed by the server 42 in FIG. 2. First, the server communication unit 77 receives the image, the acceleration, the angular velocity, the position information, the time information, the image capturing condition, and the vehicle information from the vehicle-installed apparatus 41 (121). The server communication unit 77 can receive at least the image and the position information from the vehicle-installed apparatus 41.

Next, the feature analysis unit 75 searches the feature database by using the position information. The feature analysis unit 75 checks whether an entry that is a candidate for feature matching is present (122). An entry that is a candidate for feature matching includes position information indicating a position within a prescribed range from the position indicated by the received position information. When an entry that is a candidate for feature matching is not present (122, NO), the server 42 repeats the process 121 and the following process for a next image.

When one or more entries that are candidates for feature matching are present (122, YES), the server image processing unit 74 normalizes the received image (123). The feature analysis unit 75 selects any of the entries (124). The feature analysis unit 75 performs feature matching (125).

The feature matching is such that the feature analysis unit 75 inputs the feature information included in the selected entry and the normalized image to a learning model. Using the learning model, the feature analysis unit 75 obtains a probability with which an object indicated by the feature information is presented in the image. The feature analysis unit 75 compares the obtained probability with a prescribed threshold. When the probability is greater than the prescribed threshold, the feature analysis unit 75 determines that the image corresponds to the feature information. When the probability is equal to or less than the prescribed threshold, the feature analysis unit 75 determines that the image does not correspond to the feature information.

Next, the feature analysis unit 75 checks whether the selected entry is the last entry that is a candidate for feature matching (126). When the selected entry is not the last entry (126, NO), the feature analysis unit 75 repeats the process 124 and the following processes for a next entry.

When the selected entry is the last entry (126, YES), the position analysis unit 73 checks whether there is an entry for which it has been determined that the image corresponds to the feature information (127). When there are no entries for which it has been determined that the image corresponds to the feature information (127, NO), the server 42 repeats the process 121 and the following processes for a next image.

When there are one or more entries for which it has been determined that the image corresponds to the feature information (127, YES), the position analysis unit 73 selects an entry for which the highest probability has been obtained. The position analysis unit 73 obtains an estimated position for the vehicle from the position information included in the selected entry by using the received image capturing condition and generates an estimation result that includes the scene ID of the selected entry and corrected position information indicating the estimated position (128).

Subsequently, the server communication unit 77 transmits the estimation result to the vehicle-installed apparatus 41 (129). The control unit 71 determines whether to end the position estimation process (130). When the position estimation process is not to be ended (130, NO), the server 42 repeats the process 121 and the following processes for a next image. When the position estimation process is to be ended (130, YES), the server 42 ends the process.

The configuration of the position estimation system depicted in FIGS. 1 and 2 is merely an example, and some components may be omitted or changed in accordance with applications or conditions of the position estimation system. For example, the G sensor 53, the gyro sensor 54, the alert processing unit 58, and the vehicle-installed image processing unit 59 may be omitted from the vehicle-installed apparatus 41 in FIG. 2. The learning unit 76 may be omitted when an apparatus other than the server 42 generates a feature database and a learning model.

A portable terminal apparatus may be used in place of the vehicle-installed apparatus 41. For example, the portable terminal apparatus may be a smartphone, a tablet, or a notebook personal computer. In the case of a portable terminal apparatus, the position thereof changes when the user moves with the portable terminal apparatus. The portable terminal apparatus can display a map and the position of the portable terminal apparatus on the screen.

The flowcharts in FIGS. 18-20 are merely examples, and some processes may be omitted or changed in accordance with the configuration or conditions of the position estimation system.

The feature database depicted in FIG. 3 is merely an example, and some information may be omitted or changed in accordance with the configuration or conditions of the position estimation system. The spots depicted in FIGS. 4-14 and 17 are merely examples, and the position estimation system in FIG. 2 can be applied for various spots. The brief expressway map depicted in FIG. 15 and the expressway chart depicted in FIG. 16 are merely examples, and a different brief expressway map or expressway chart may be used in accordance with what navigation apparatus is used.

FIG. 21 illustrates an example of the hardware configuration of an information processing apparatus to be used as the information processing apparatus 11 or the position estimation apparatus 12 in FIG. 1 or as the vehicle-installed apparatus 41 or the server 42 in FIG. 2. The information processing apparatus in FIG. 21 may be referred to as a computer. The information processing apparatus in FIG. 21 includes a central processing unit (CPU) 91, a memory 92, an input device 93, an output device 94, an auxiliary storage device 95, a medium driving device 96, and a network connecting device 97. These elements are hardware and connected to each other by a bus 98.

When the information processing apparatus is the vehicle-installed apparatus 41 in FIG. 2, the vehicle-installed image capturing unit 52, the G sensor 53, the gyro sensor 54, the receiver 55, the microphone 62, the speaker 63, and the clock 64 may be connected to the bus 98.

For example, the memory 92 may include a semiconductor memory. The semiconductor memory is, for example, a read only memory (ROM), a random access memory (RAM), or a flash memory. The memory 92 stores a program and data to be used for processing. The memory 92 may be used as the storage unit 32 in FIG. 1 or the vehicle-installed storage unit 61 or the server storage unit 72 in FIG. 2.

The CPU 91 may be referred to as a processor. For example, the CPU 91 may execute a program by using the memory 92 so as to operate as the estimation unit 33 in FIG. 1. The CPU 91 executes a program by using the memory 92 so as to operate as the control unit 51, the correction unit 57, the alert processing unit 58, and the vehicle-installed image processing unit 59 in FIG. 2. The CPU 91 also executes a program by using the memory 92 so as to operate as the control unit 71, the position analysis unit 73, the server image processing unit 74, the feature analysis unit 75, and the learning unit 76 in FIG. 2.

The input device 93 is used to input an instruction or information from an operator or a user. The input device 93 may be used as the operation unit 66 in FIG. 2. The input device 93 includes, for example, a keyboard or a pointing device.

The output device 94 is used to output a processing result. For example, the output device 94 may be used to put a query, or give an instruction, to an operator or a user. The output device 94 includes, for example, a display device, a printer, or a speaker. The processing result may be an estimation result generated by the position analysis unit 73 or a position corrected on the basis of corrected position information included in the estimation result. The output device 94 may be used as the output unit 65 in FIG. 2.

The auxiliary storage device 95 is, for example, a magnetic disk device, an optical disk device, a magneto-optical disk device, or a tape device. The auxiliary storage device 95 may be a hard disk drive or a flash memory. The information processing apparatus may use a program and data stored in the auxiliary storage device 95 by loading them into the memory 92. The auxiliary storage device 95 may be used as the storage unit 32 in FIG. 1 or the vehicle-installed storage unit 61 or the server storage unit 72 in FIG. 2.

The medium driving device 96 drives a portable recording medium 99 and accesses items recorded therein. The portable recording medium 99 is, for example, a memory device, a flexible disk, an optical disk, or a magneto-optical disk. The portable recording medium 99 may be a compact disk read only memory (CD-ROM), a digital versatile disk (DVD), or a universal serial bus (USB) memory. An operator or a user may store a program and data in the portable recording medium 99 and use the program and the data by loading them into the memory 92.

The computer-readable recording medium that stores a program and data to be used for the processing is a non-transitory recording medium such as the memory 92, the auxiliary storage device 95, or the portable recording medium 99.

The network connecting device 97 is a communication interface circuit that is connected to the communication network 43 and performs data conversion associated with a communication. The information processing apparatus may receive a program and data from an external apparatus via the network connecting device 97 and use the program and the data by loading them into the memory 92. The network connecting device 97 may be used as the vehicle-installed communication unit 56 or the server communication unit 77 in FIG. 2.

The information processing apparatus does not need to include all of the elements in FIG. 21, and some of the elements can be omitted in accordance with an application or conditions. For example, the input device 93 and the output device 94 may be omitted when the information processing apparatus is the server 42 in FIG. 2 and an interface for the operator or user is not necessary. The medium driving device 96 may be omitted when the portable recording medium 99 is not used.

Although the disclosed embodiments and advantages thereof have been described in detail, a person skilled in the art could implement various changes, additions, or omissions without departing from the scope of the invention explicitly set forth in the claims.

What is claimed is:

1. A position estimation system comprising:
an information processing apparatus;
a position estimation apparatus; and
a first processor, wherein
the information processing apparatus includes:
an acquisition circuit configured to acquire first position information indicating a position of the information processing apparatus;
a camera configured to capture a first image at the position indicated by the first position information;
a transmission circuit configured to transmit the first position information and the first image to the position estimation apparatus; and
a display apparatus configured to display a map,
the position estimation apparatus includes:
a reception circuit configured to receive the first position information and the first image from the information processing apparatus;
a memory configured to store second position information indicating a prescribed position on the map and feature information extracted from a second image corresponding to the prescribed position, the second position information being associated with the feature information extracted from the second image; and
a second processor configured to estimate the position indicated by the first position information on the basis of the second position information in the case that the position indicated by the first position information falls within a prescribed range from the prescribed position indicated by the second position information and the first image corresponds to the feature information extracted from the second image image, and obtain an estimated position for the information processing apparatus,
the position estimation apparatus transmits third position information indicating the estimated position to the information processing apparatus,
the display apparatus displays the estimated position on the map on the basis of the third position information,
map information indicating the map includes a road network,
the road network includes a plurality of nodes and a plurality of links each linking nodes among the plurality of nodes and has a simplified shape of an actual road, and
the first processor has a map matching function for correcting, to a position on the road network, a position that does not match any of the plurality of nodes or the plurality of links included in the road network and suppresses application of the map matching function to the third position information.

2. The position estimation system according to claim 1, wherein
the second processor determines whether the first image corresponds to the feature information extracted from the second image by using a learning model generated by a learning process for feature information extracted from each of a plurality of images.

3. The position estimation system according to claim 2, wherein
the second processor obtains, by using the learning model, a probability with which an object presented in the second image is presented in the first image and determines that the first image corresponds to the feature information extracted from the second image when the probability is greater than a threshold.

4. A position estimation method comprising:
acquiring first position information indicating a position and a first image captured by a camera in an information processing apparatus at the position indicated by the first position information; and
displaying an estimated position for the information processing apparatus on a map by suppressing application of a map matching function to the estimated position,
wherein:
the estimated position is obtained by estimating, by a processor, the position indicated by the first position information on the basis of second position information in the case that the position indicated by the first position information falls within a prescribed range from a prescribed position indicated on the map by the second position information and the first image corresponds to feature information that is stored and associated with the second position information after being extracted from a second image corresponding to the prescribed position,
map information indicating the map includes a road network,
the road network includes a plurality of nodes and a plurality of links each linking nodes among the plurality of nodes and has a simplified shape of an actual road, and
the map matching function corrects, to a position on the road network, a position that does not match any of the plurality of nodes or the plurality of links included in the road network.

5. A non-transitory computer-readable recording medium having stored therein a position estimation program that causes a computer to execute a process comprising:
acquiring first position information indicating a position and a first image captured by an image capturing unit in the computer at the position indicated by the first position information; and
displaying an estimated position for the computer on a map by suppressing application of a map matching function to the estimated position,
wherein:
the estimated position is obtained by estimating the position indicated by the first position information on the basis of second position information in the case that the position indicated by the first position information falls within a prescribed range from a prescribed position indicated on the map by the second position information and the first image corresponds to feature information that is stored and associated with the second position information after being extracted from a second image corresponding to the prescribed position,
map information indicating the map includes a road network,
the road network includes a plurality of nodes and a plurality of links each linking nodes among the plurality of nodes and has a simplified shape of an actual road, and
the map matching function corrects, to a position on the road network, a position that does not match any of the plurality of nodes or the plurality of links included in the road network.

* * * * *